United States Patent
Dervovic et al.

(10) Patent No.: US 12,530,623 B2
(45) Date of Patent: Jan. 20, 2026

(54) SYSTEM, METHOD, AND COMPUTER PROGRAM FOR COMPUTING CHANGE-AGNOSTIC DATA POINTS THROUGH VARIABILITY EXPLANATION STRESS TESTING

(71) Applicant: JPMorgan Chase Bank, N.A., New York, NY (US)

(72) Inventors: Danial Dervovic, London (GB); Freddy Lecue, Mamaroneck, NY (US); Carlos Perez, London (GB); Pietro Smacchia, London (GB); Daniele Magazzeni, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 575 days.

(21) Appl. No.: 18/094,679

(22) Filed: Jan. 9, 2023

(65) Prior Publication Data
US 2024/0232696 A1 Jul. 11, 2024

(51) Int. Cl.
*G06N 20/00* (2019.01)
(52) U.S. Cl.
CPC .................. *G06N 20/00* (2019.01)
(58) Field of Classification Search
CPC ....................................... G06N 20/00
See application file for complete search history.

(56) References Cited

U.S. PATENT DOCUMENTS

| | | | | |
|---|---|---|---|---|
| 5,408,587 | A * | 4/1995 | Maier | G06N 5/045 706/53 |
| 11,797,881 | B2 * | 10/2023 | Arendt | G06F 18/2323 |
| 11,983,777 | B1 * | 5/2024 | Metzger | G06Q 40/08 |
| 12,380,357 | B2 * | 8/2025 | Nia | G06N 5/045 |
| 2020/0250557 | A1 * | 8/2020 | Kishimoto | G06N 5/045 |
| 2021/0012156 | A1 * | 1/2021 | Vijaykeerthy | G06N 3/084 |
| 2021/0012897 | A1 * | 1/2021 | Katuwal | G06N 20/00 |
| 2021/0133610 | A1 * | 5/2021 | Natesan Ramamurthy | G06N 20/00 |
| 2021/0142190 | A1 * | 5/2021 | Isahagian | G06N 5/04 |
| 2021/0158075 | A1 * | 5/2021 | Shoshan | G06V 10/774 |
| 2021/0192376 | A1 * | 6/2021 | Sarferaz | G06F 40/40 |
| 2021/0248455 | A1 * | 8/2021 | Reddy | G06N 3/045 |
| 2022/0114481 | A1 * | 4/2022 | Yang | G06N 20/20 |

(Continued)

*Primary Examiner* — David E Choi
(74) *Attorney, Agent, or Firm* — GREENBLUM & BERNSTEIN, P.L.C.

(57) ABSTRACT

Various methods, apparatuses/systems, and media for computing change-agnostic data points are disclosed. A processor trains a machine learning model by using the at least the first set of raw data; computes a set of explanations for all combinations based on output data of the trained machine learning model, the first set of raw data, and sampled raw data computed by applying a sampling algorithm on the raw data; computes a compact representation of the set of explanations corresponding to a pre-configured dimension based on compression quality and generating a set of compressed explanations; computes a unique representation of model explanation with respect to the pre-configured dimension; determines whether the model explanation is robust to changes in data through data perturbation; and computes change-agnostic data points based on determining that the model explanation is robust to changes in data through data perturbation.

20 Claims, 7 Drawing Sheets

(56) References Cited

U.S. PATENT DOCUMENTS

| | | | |
|---|---|---|---|
| 2023/0153658 A1* | 5/2023 | Wu | G06F 11/3086 |
| | | | 706/46 |
| 2023/0206096 A1* | 6/2023 | Paiement | G06N 3/08 |
| | | | 706/52 |
| 2023/0229946 A1* | 7/2023 | O'Shaughnessy | G06N 3/088 |
| | | | 706/45 |
| 2024/0119293 A1* | 4/2024 | Lyons | G06N 20/00 |
| 2024/0135239 A1* | 4/2024 | Dhurandhar | G06N 5/04 |
| 2024/0202516 A1* | 6/2024 | Zoldi | G06N 3/08 |
| 2024/0232696 A1* | 7/2024 | Dervovic | G06N 3/045 |
| 2024/0256927 A1* | 8/2024 | Albini | G06N 5/022 |
| 2024/0281684 A1* | 8/2024 | Boyarskaya | G06N 5/045 |
| 2024/0303552 A1* | 9/2024 | Saha | G06N 20/20 |
| 2025/0014096 A1* | 1/2025 | Lecue | G06Q 40/03 |
| 2025/0053885 A1* | 2/2025 | Schmidt | G06N 20/20 |
| 2025/0173598 A1* | 5/2025 | Geada | G06N 5/045 |

* cited by examiner

SYSTEM, METHOD, AND COMPUTER PROGRAM FOR COMPUTING CHANGE-AGNOSTIC DATA POINTS THROUGH VARIABILITY EXPLANATION STRESS TESTING

TECHNICAL FIELD

This disclosure generally relates to data processing, and, more particularly, to methods and apparatuses for implementing a data points computing module configured to compute change-agnostic data points which are robust to explanation stress testing.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Today, a wide variety of business functions are commonly supported by software applications and tools, i.e., business intelligence (BI) tools. For instance, software has been directed to data processing, data migration, monitoring, performance analysis, project tracking, data management, generating bond pricing, predicting stock pricing, and competitive analysis, to name but a few. Accurate and meaningful risk analysis may prove to be essential to superior investment performance, i.e., generating bond pricing, predicting stock pricing, etc. Often, prediction models are utilized to minimize such risks. Moreover, relations between input data points of a prediction model and explanations may prove to be very complex due to the complexity of underlying machine learning models e.g., non-linearity in Deep Neural Network architectures.

For example, when feeding an input data, the computed explanation of the model decision might be subject to change under input data manipulation or small perturbations. It is important to quantify and evaluate these changes, as well as computing alternative data points which might be less perturbable, and therefore more robust; and therefore, recommend users change in the initial data points to ensure explanation remain valid for regulators, and different enforcement teams. Indeed, regulators may not tolerate explanations that may change over small perturbations.

Thus, there is a need for an advanced tool that can generate change-agnostic datapoints.

SUMMARY

The present disclosure, through one or more of its various aspects, embodiments, and/or specific features or sub-components, provides, among other features, various systems, servers, devices, methods, media, programs, and platforms for implementing a data points computing module configured to compute change-agnostic data points which are robust to explanation stress testing so that outputs generated by a model remain the same in response to change under input data manipulation or small perturbations, but the disclosure is not limited thereto.

For example, there might be data points that do exist in the initial distribution of data points that need to be constructed. The present disclosure, through one or more of its various aspects, embodiments, and/or specific features or sub-components, provides, among other features, various systems, servers, devices, methods, media, programs, and platforms for implementing a data points computing module configured to construct the change-agnostic data points that exist in the initial distribution of data points. According to exemplary embodiments, the data points computing module may be configured to compute such individuals (input data) as explanation-trusted input data close to the initial input data in case data could be changed and updated.

It is well understood that regulators of bank models are convinced by models which are somehow deterministic and does not drastically change decision under small input perturbations. For example, when predicting credit card approval or rejection, it may prove to be better to use model which does not switch decisions for two similar individuals, otherwise the model could not be used. It is therefore important to use models which are only stable for a maximum of data points, and provide the space of input data or applicants for which the model is safe to use, i.e., safe operation mode in which explanations are not expected to change dramatically in the space computed. According to exemplary embodiments, the data points computing module may be configured to ensure that the model is safe to use.

According to exemplary embodiments, a method for computing change-agnostic data points by utilizing one or more processors along with allocated memory is disclosed. The method may include: receiving at least a first set of raw data that is usable for training a machine learning model: training the machine learning model by using the at least the first set of raw data: computing a set of explanations for all combinations based on output data of the trained machine learning model, the first set of raw data, and sampled raw data computed by applying a sampling algorithm on the raw data: computing a compact representation of the set of explanations corresponding to a pre-configured dimension based on compression quality and generating a set of compressed explanations: computing a unique representation of model explanation with respect to the pre-configured dimension: determining whether the model explanation is robust to changes in data through data perturbation; and computing change-agnostic data points based on determining that the model explanation is robust to changes in data through data perturbation.

According to exemplary embodiments, wherein the first set of raw data may include prediction data computed by the machine learning model, input raw data utilized for navigating explanation-dimension used for extending explanation search space, and sampled raw data computed by implementing a data distribution sampling strategy on the input raw data.

According to exemplary embodiments, wherein the pre-configured dimension includes one dimensional representation, two dimensional representation, three dimensional representation, or more than three dimensional representations based on the compression quality.

According to exemplary embodiments, in computing the set of compressed explanations, the method may further include: implementing an auto-encoder algorithm or principal component analysis algorithm.

According to exemplary embodiments, in determining whether the model explanation is robust to changes in data through data perturbation, the method may further include: receiving perturbated input data to be tested, wherein the perturbated input data is generated by implementing a data perturbation strategy: receiving the first set of raw data; receiving the sampled raw data: generating perturbated target data based on processing the received perturbated input data, the first set of raw data, and the sampled raw data;

and performing a variability test based on compressed explanations of the perturbated target data, compressed explanations of input target data: and explanation variability score that is described as a vector along the pre-configured dimension.

According to exemplary embodiments, wherein the data perturbation strategy includes adding 1 to all features or replace one feature by an average value of all individual features to the at least the first set of raw data.

According to exemplary embodiments, the method may further include: determining whether a numerical value of compressed explanations of the perturbated target data is greater than the explanation variability score: and computing the change-agnostic data points based on a determination that the numerical value of the compressed explanations of the perturbated target data is greater than the explanation variability score.

According to exemplary embodiments, wherein the machine learning model includes one or more of the following models: decision tree, ensemble tress, neural network architectures, and predictive model, but the disclosure is not limited thereto.

According to exemplary embodiments, a system for computing change-agnostic data points is disclosed. The system may include: a processor: and a memory operatively connected to the processor via a communication interface, the memory storing computer readable instructions, when executed, may cause the processor to: receive at least a first set of raw data that is usable for training a machine learning model: train the machine learning model by using the at least the first set of raw data: compute a set of explanations for all combinations based on output data of the trained machine learning model, the first set of raw data, and sampled raw data computed by applying a sampling algorithm on the raw data: compute a compact representation of the set of explanations corresponding to a pre-configured dimension based on compression quality and generating a set of compressed explanations: compute a unique representation of model explanation with respect to the pre-configured dimension; determine whether the model explanation is robust to changes in data through data perturbation; and compute change-agnostic data points based on determining that the model explanation is robust to changes in data through data perturbation.

According to exemplary embodiments, in computing the set of compressed explanations, the processor may be further configured to: implement an auto-encoder algorithm or principal component analysis algorithm.

According to exemplary embodiments, in determining whether the model explanation is robust to changes in data through data perturbation, the processor may be further configured to: receive perturbated input data to be tested, wherein the perturbated input data is generated by implementing a data perturbation strategy: receive the first set of raw data: receive the sampled raw data: generate perturbated target data based on processing the received perturbated input data, the first set of raw data, and the sampled raw data: and perform a variability test based on compressed explanations of the perturbated target data, compressed explanations of input target data: and explanation variability score that is described as a vector along the pre-configured dimension.

According to exemplary embodiments, the processor may be further configured to: determine whether a numerical value of compressed explanations of the perturbated target data is greater than the explanation variability score: and compute the change-agnostic data points based on a determination that the numerical value of the compressed explanations of the perturbated target data is greater than the explanation variability score.

According to exemplary embodiments, a non-transitory computer readable medium configured to store instructions for computing change-agnostic data points is disclosed. The instructions, when executed, may cause a processor to perform the following: receiving at least a first set of raw data that is usable for training a machine learning model; training the machine learning model by using the at least the first set of raw data: computing a set of explanations for all combinations based on output data of the trained machine learning model, the first set of raw data, and sampled raw data computed by applying a sampling algorithm on the raw data: computing a compact representation of the set of explanations corresponding to a pre-configured dimension based on compression quality and generating a set of compressed explanations: computing a unique representation of model explanation with respect to the pre-configured dimension: determining whether the model explanation is robust to changes in data through data perturbation: and computing change-agnostic data points based on determining that the model explanation is robust to changes in data through data perturbation.

According to exemplary embodiments, in computing the set of compressed explanations, the instructions, when executed, may cause the processor to perform the following: implementing an auto-encoder algorithm or principal component analysis algorithm.

According to exemplary embodiments, in determining whether the model explanation is robust to changes in data through data perturbation, the instructions, when executed, may cause the processor to perform the following: receiving perturbated input data to be tested, wherein the perturbated input data is generated by implementing a data perturbation strategy: receiving the first set of raw data: receiving the sampled raw data; generating perturbated target data based on processing the received perturbated input data, the first set of raw data, and the sampled raw data: and performing a variability test based on compressed explanations of the perturbated target data, compressed explanations of input target data: and explanation variability score that is described as a vector along the pre-configured dimension.

According to exemplary embodiments, the instructions, when executed, may cause the processor to perform the following: determining whether a numerical value of compressed explanations of the perturbated target data is greater than the explanation variability score: and computing the change-agnostic data points based on a determination that the numerical value of the compressed explanations of the perturbated target data is greater than the explanation variability score.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
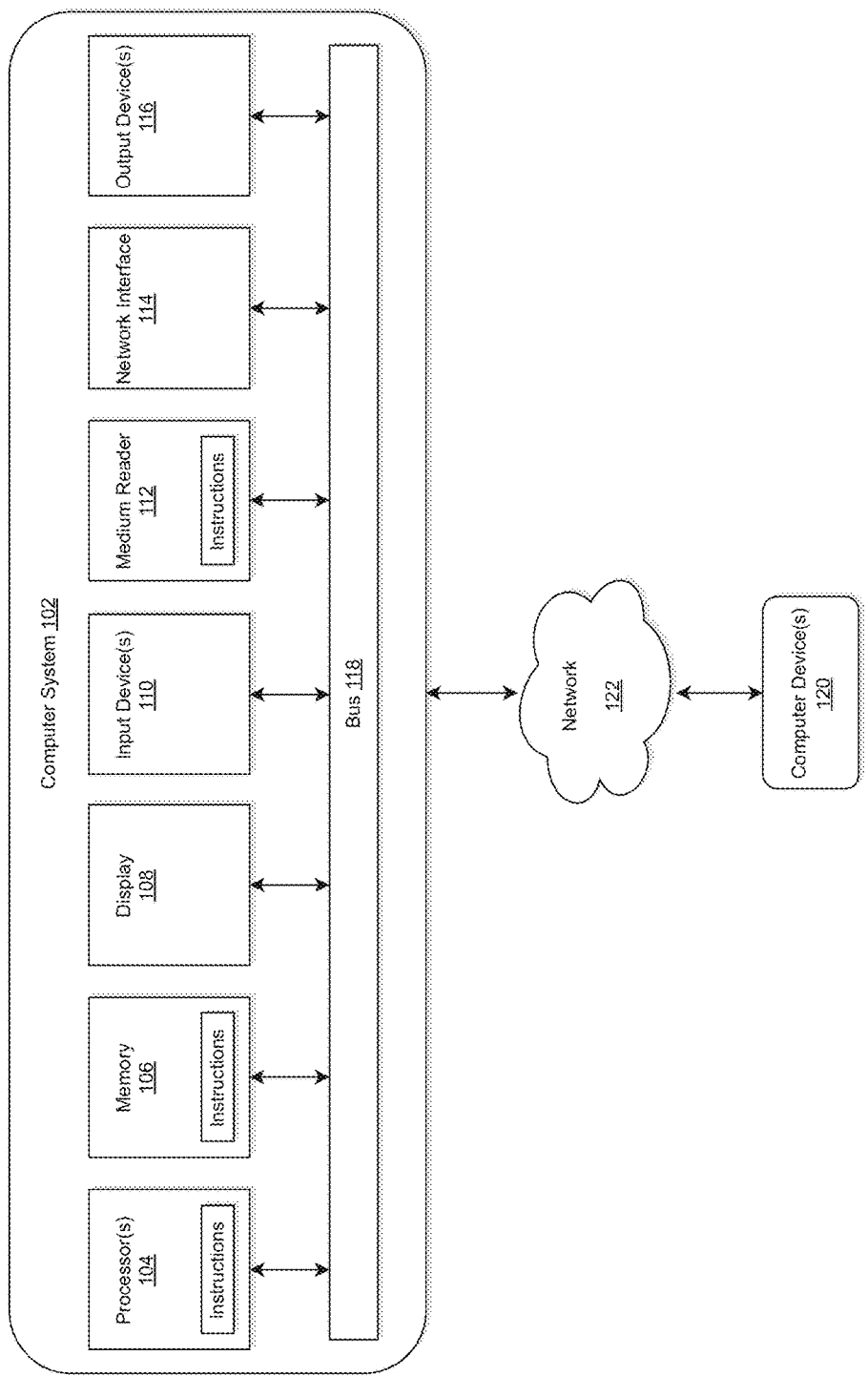
FIG. 1 illustrates a computer system for implementing a data points computing module configured to compute change-agnostic data points in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a platform, language, database, and cloud agnostic data points computing module configured to compute change-agnostic data points in accordance with an exemplary embodiment. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the data points computing module may be platform, language, database, and cloud agnostic that may allow for consistent easy orchestration and passing of data through various components to output a desired result regardless of platform, language, database, and cloud environment. Since the disclosed process, according to exemplary embodiments, is platform, language, database, and cloud agnostic, the data points computing module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
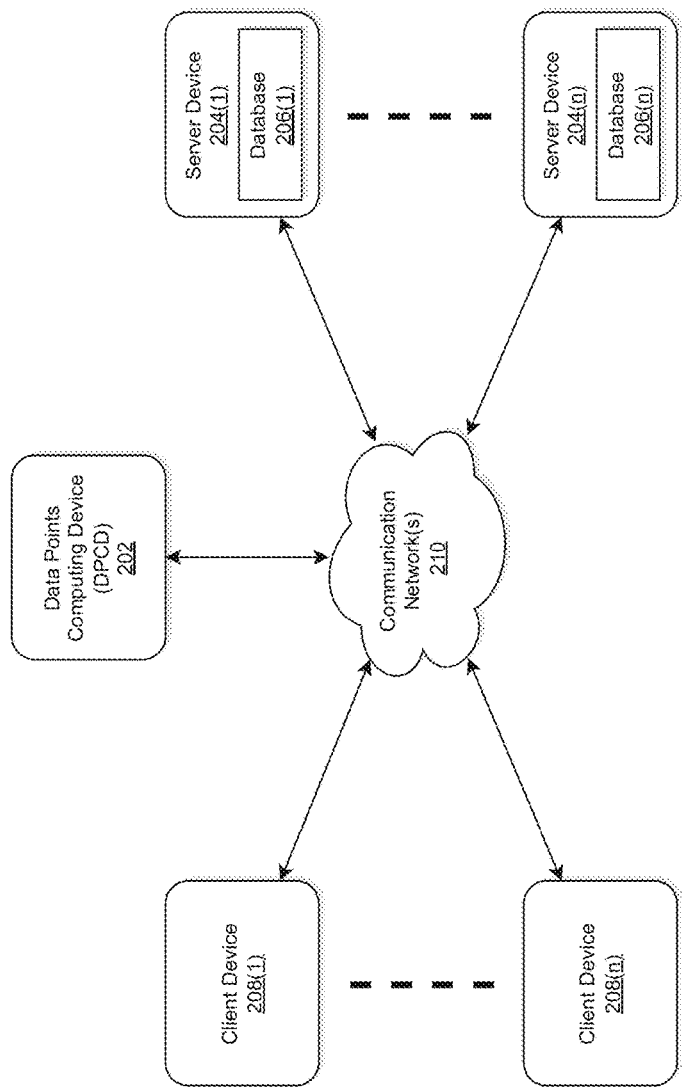
FIG. 2 illustrates an exemplary diagram of a network environment with a data points computing device in accordance with an exemplary embodiment.

Referring to FIG. 2, a schematic of an exemplary network environment 200 for implementing a language, platform, database, and cloud agnostic data points computing device (DPCD) of the instant disclosure is illustrated.

According to exemplary embodiments, the above-described problems associated with conventional tools may be overcome by implementing a DPCD 202 as illustrated in FIG. 2 that may be configured for implementing a platform, language, cloud, and database agnostic data points computing module configured to compute change-agnostic data points which are robust to explanation stress testing so that outputs generated by a model remain the same in response to change under input data manipulation or small perturbations, but the disclosure is not limited thereto. For example, according to exemplary embodiments, the above-described problems associated with conventional tools may be overcome by implementing a DPCD 202 as illustrated in FIG. 2 that may be configured for implementing a platform, language, cloud, and database data points computing module configured to construct the change-agnostic data points that exist in the initial distribution of data points. According to exemplary embodiments, the data points computing module may be configured to compute such individuals (input data) as explanation-trusted input data close to the initial input data in case data could be changed and updated, but the disclosure is not limited thereto.

The DPCD 202 may be the same or similar to the computer system 102 as described with respect to FIG. 1.

The DPCD 202 may store one or more applications that can include executable instructions that, when executed by the DPCD 202, cause the DPCD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DPCD 202 itself, may be located in virtual server(s) running in a cloud-based computing environment rather than being tied to one or more specific physical network computing devices. Also, the application(s) may be running in one or more virtual machines (VMs) executing on the DPCD 202. Additionally, in one or more embodiments of this technology, virtual machine(s) running on the DPCD 202 may be managed or supervised by a hypervisor.

In the network environment 200 of FIG. 2, the DPCD 202 is coupled to a plurality of server devices 204(1)-204(n) that hosts a plurality of databases 206(1)-206(n), and also to a plurality of client devices 208(1)-208(n) via communication network(s) 210. A communication interface of the DPCD 202, such as the network interface 114 of the computer system 102 of FIG. 1, operatively couples and communicates between the DPCD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DPCD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DPCD 202 may be a standalone device or integrated with one or more other devices or apparatuses, such as one or more of the server devices 204(1)-204(n), for example. In one particular example, the DPCD 202 may be hosted by one of the server devices 204(1)-204(n), and other arrangements are also possible. Moreover, one or more of the devices of the DPCD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DPCD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the DPCD 202 that may efficiently provide a platform for implementing a platform, language, cloud, and database agnostic data points computing module configured to compute change-agnostic data points which are robust to explanation stress testing so that outputs generated by a model remain the same in response to change under input data manipulation or small perturbations, but the disclosure is not limited thereto. According to exemplary embodiments, the client devices 208(1)-208(n) in this example may include any type of computing device that can facilitate the implementation of the DPCD 202 that may efficiently provide a platform for implementing a platform, language, cloud, and database data points computing module configured to construct the change-agnostic data points that exist in the initial distribution of data points. According to exemplary embodiments, the data points computing module may be configured to compute such individuals (input data) as explanation-trusted input data close to the initial input data in case data could be changed and updated, but the disclosure is not limited thereto.

The client devices 208(1)-208(n) may run interface applications, such as standard web browsers or standalone client applications, which may provide an interface to communicate with the DPCD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the DPCD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the DPCD 202, the server devices 204(1)-204(n), or the client devices 208(1)-208(n), for example, may be configured to operate as virtual instances on the same physical machine. For example, one or more of the DPCD 202, the server devices 204(1)-204(n), or the client devices 208(1)-208(n) may operate on the same physical device rather than as separate devices communicating through communication network(s) 210. Additionally, there may be more or fewer DPCDs 202, server devices 204(1)-204(n), or client devices 208(1)-208(n) than illustrated in FIG. 2. According to exemplary embodiments, the DPCD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
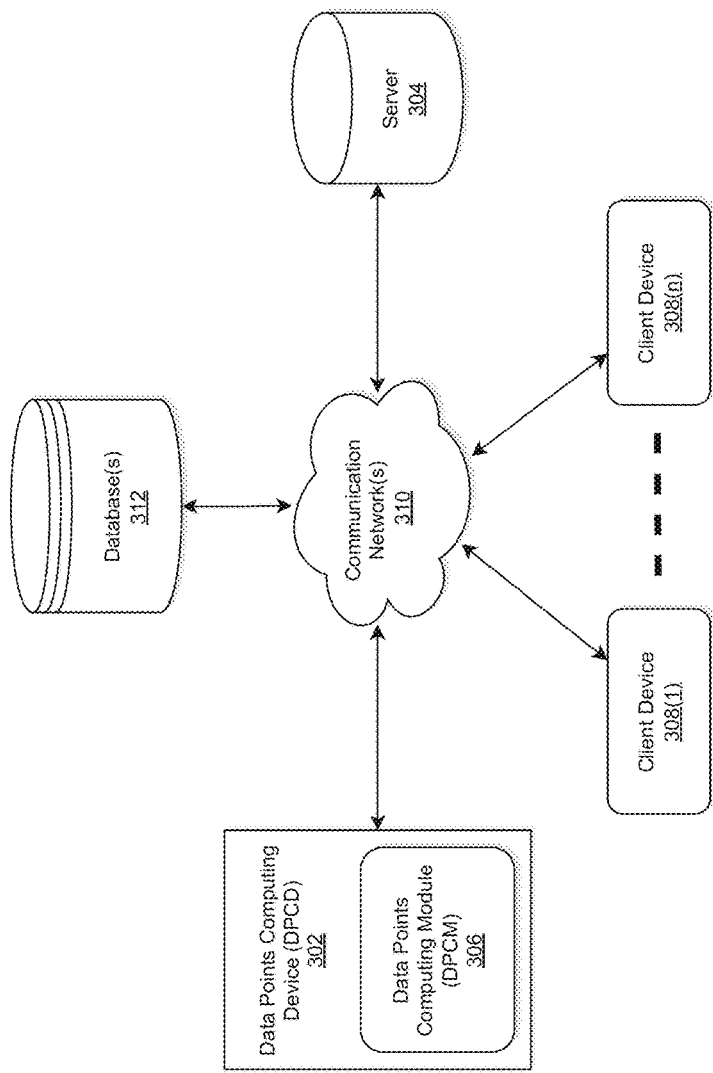
FIG. 3 illustrates a system diagram for implementing a data points computing device having a data points computing module in accordance with an exemplary embodiment.

FIG. 3 illustrates a system diagram for implementing a platform, language, and cloud agnostic DPCD having a platform, language, database, and cloud agnostic data points computing module (DPCM) in accordance with an exemplary embodiment.

As illustrated in FIG. 3, the system 300 may include an DPCD 302 within which an DPCM 306 is embedded, a server 304, a database(s) 312, a plurality of client devices 308(1) . . . 308(n), and a communication network 310.

According to exemplary embodiments, the DPCD 302 including the DPCM 306 may be connected to the server 304, and the database(s) 312 via the communication network 310. The DPCD 302 may also be connected to the plurality of client devices 308(1) . . . 308(n) via the communication network 310, but the disclosure is not limited thereto.

According to exemplary embodiment, the DPCD 302 is described and shown in FIG. 3 as including the DPCM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a mainframe database, a log database that may produce programming for searching, monitoring, and analyzing machine-generated data via a web interface, etc., but the disclosure is not limited thereto.

According to exemplary embodiments, the DPCM 306 may be configured to receive real-time feed of data from the plurality of client devices 308(1) . . . 308(n) and secondary sources via the communication network 310.

As may be described below, the DPCM 306 may be configured to: receive at least a first set of raw data that is usable for training a machine learning model: train the machine learning model by using the at least the first set of raw data: compute a set of explanations for all combinations based on output data of the trained machine learning model, the first set of raw data, and sampled raw data computed by applying a sampling algorithm on the raw data: compute a compact representation of the set of explanations corresponding to a pre-configured dimension based on compression quality and generating a set of compressed explanations: compute a unique representation of model explanation with respect to the pre-configured dimension: determine whether the model explanation is robust to changes in data through data perturbation; and compute change-agnostic data points based on determining that the model explanation is robust to changes in data through data perturbation, but the disclosure is not limited thereto.

The plurality of client devices 308(1) . . . 308(n) are illustrated as being in communication with the DPCD 302. In this regard, the plurality of client devices 308(1) . . . 308(n) may be "clients" (e.g., customers) of the DPCD 302 and are described herein as such. Nevertheless, it is to be known and understood that the plurality of client devices 308(1) . . . 308(n) need not necessarily be "clients" of the DPCD 302, or any entity described in association therewith herein. Any additional or alternative relationship may exist between either or both of the plurality of client devices 308(1) . . . 308(n) and the DPCD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the DPCD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The DPCD 302 may be the same or similar to the DPCD 202 as described with respect to FIG. 2, including any features or combination of features described with respect thereto.

Figure 4:
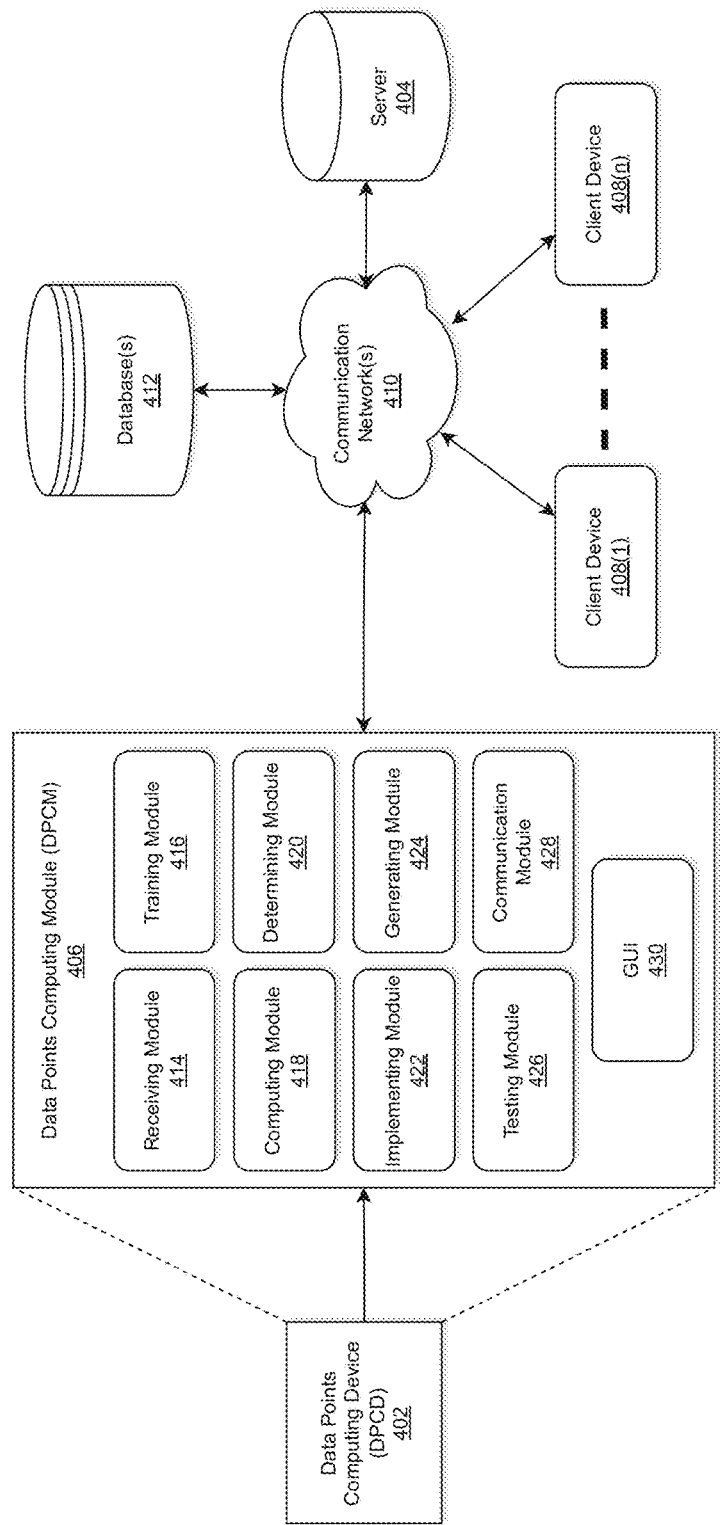
FIG. 4 illustrates a system diagram for implementing a data points computing module of FIG. 3 in accordance with an exemplary embodiment.

FIG. 4 illustrates a system diagram for implementing a DPCM of FIG. 3 in accordance with an exemplary embodiment.

According to exemplary embodiments, the system 400 may include a platform, language, database, and cloud agnostic DPCD 402 within which a platform, language, database, and cloud agnostic DPCM 406 is embedded, a server 404, database(s) 412, and a communication network 410. According to exemplary embodiments, server 404 may comprise a plurality of servers located centrally or located in different locations, but the disclosure is not limited thereto.

According to exemplary embodiments, the DPCD 402 including the DPCM 406 may be connected to the server 404 and the database(s) 412 via the communication network 410. The DPCD 402 may also be connected to the plurality of client devices 408(1)-408(n) via the communication network 410, but the disclosure is not limited thereto. The DPCM 406, the server 404, the plurality of client devices 408(1)-408(n), the database(s) 412, the communication network 410 as illustrated in FIG. 4 may be the same or similar to the DPCM 306, the server 304, the plurality of client devices 308(1)-308(n), the database(s) 312, the communication network 310, respectively, as illustrated in FIG. 3.

According to exemplary embodiments, as illustrated in FIG. 4, the DPCM 406 may include a receiving module 414, a training module 416, a computing module 418, a determining module 420, an implementing module 422, a generating module 424, a testing module 426, a communication module 428, and a graphical user interface (GUI) 430. According to exemplary embodiments, interactions and data exchange among these modules included in the DPCM 406 provide the advantageous effects of the disclosed invention. Functionalities of each module of FIG. 4 may be described in detail below with reference to FIGS. 4-6.

According to exemplary embodiments, each of the receiving module 414, the training module 416, the computing module 418, the determining module 420, the implementing module 422, the generating module 424, the testing module 426, and the communication module 428 of the DPCM 406 of FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the receiving module 414, the training module 416, the computing module 418, the determining module 420, the implementing module 422, the generating module 424, the testing module 426, and the communication module 428 of the DPCM 406 of FIG. 4 may be implemented by microprocessors or similar, and may be programmed using software (e.g., microcode) to perform various functions discussed herein and may optionally be driven by firmware and/or software.

Alternatively, according to exemplary embodiments, each of the receiving module 414, the training module 416, the computing module 418, the determining module 420, the implementing module 422, the generating module 424, the testing module 426, and the communication module 428 of the DPCM 406 of FIG. 4 may be implemented by dedicated hardware, or as a combination of dedicated hardware to perform some functions and a processor (e.g., one or more programmed microprocessors and associated circuitry) to perform other functions.

According to exemplary embodiments, each of the receiving module 414, the training module 416, the computing module 418, the determining module 420, the implementing module 422, the generating module 424, the testing module 426, and the communication module 428 of the DPCM 406 of FIG. 4 may be called via corresponding API.

According to exemplary embodiments, the process implemented by the DPCM 406 may be executed via the communication module 428 and the communication network 410, which may comprise plural networks as described above. For example, in an exemplary embodiment, the various components of the DPCM 406 may communicate with the server 404, and the database(s) 412 via the communication module 428 and the communication network 410. Of course, these embodiments are merely exemplary and are not limiting or exhaustive. The database(s) 412 may include the databases included within the private cloud and/or public cloud and the server 404 may include one or more servers within the private cloud and the public cloud.

There might be data points that do exist in the initial distribution of data points that need to be constructed. The DPCM 406 may be configured to construct the change-agnostic data points that exist in the initial distribution of data points. According to exemplary embodiments, the DPCM 406 may be configured to compute such individuals (input data) as explanation-trusted input data close to the initial input data in case data could be changed and updated.

For example, it is well understood that regulators of bank models are convinced by models which are somehow deterministic and does not drastically change decision under small input perturbations. For example, when predicting credit card approval or rejection, it may prove to be better to use model which does not switch decisions for two similar individuals, otherwise the model could not be used. It is therefore important to use models which are only stable for a maximum of data points, and provide the space of input data or applicants for which the model is safe to use, i.e., safe operation mode in which explanations are not expected to change dramatically in the space computed. According to exemplary embodiments, the DPCM 406 may be configured to ensure that the model is safe to use.

For an exemplary embodiment, Branch A may include explanation of perturbated data using baseline model M_R (different branch for clarity and easy in reading); and Branch B may include explanation of target data using baseline model M_R (different branch for clarity and easy in reading).

According to exemplary embodiments, input raw data R received by the receiving module 414 may include: X1 (A=0, B=1, C=8, D=9): X2 (A=0, B=30, C=1, D=2): X3 (A=0, B=3, C=8, D=−31); . . . ; and Xn (A=7, B=2, C=6, D=5). According to exemplary embodiments, the input raw data may correspond to time series of security instrument (i.e., bond, stock, etc., but the disclosure is not limited thereto) history which may be tabular data, image, or text.

According to exemplary embodiments, data distribution sampling strategies may include: strategy 1: selecting 3 random points; strategy 2: selecting 3 with feature A=0; strategy 3: selecting the first 3, etc., but the disclosure is not limited thereto.

According to exemplary embodiments, explanation variability is described as a vector along the number of dimensions of the explanation. For example, it could one dimension (1), two dimensions (2), or more dimensions as necessary. For the purpose of this embodiment, it is assumed that variability=2, but the disclosure is not limited thereto.

According to exemplary embodiments, input target data T to be tested and challenged may include: T (A=12, B=4, C=11, D=17), but the disclosure is not limited thereto.

According to exemplary embodiments, data perturbation strategy may include strategy 1: adding 1 to all features: strategy 2: replacing one feature by the average value of all individuals, but the disclosure is not limited thereto.

According to exemplary embodiments, the DPCM 406 may implement a pre-processing A for model training and computing. Pre-processing step A corresponds to learning/training a model representative of the input raw data R, e.g., predictive model M_R. According to exemplary embodiments, other models can be computed, e.g., decision tree, ensemble trees, neural network architectures, etc., but the disclosure is not limited thereto.

According to exemplary embodiments, the DPCM 406 may implement a pre-processing B for applying data distribution sampling strategy on the input raw data R. For example, sampled raw data may include: SR, i.e., R, after sampling: X1 (A=0, B=1, C=8, D=9); X2 (A=0, B=30, C=1, D=2): X3 (A=0, B=3, C=8, D=−31) used as background data for explanation.

According to exemplary embodiments, the DPCM 406 may be configured to implement another pre-processing step of data perturbation by utilizing the data perturbation strategy, data distribution sampling strategy and the input raw data R as disclosed above. According to exemplary embodiments this data perturbation pre-processing step may output perturbated target data TD as follows: X1 (A=0, B=31, C=8, D=9): X2 (A=0, B=30, C=1, D=2): X3 (A=0, B=31, C=8, D=−31); . . . ; and Xn (A=7, B=31, C=6, D=5), but the disclosure is not limited thereto.

According to exemplary embodiments, the DPCM 406 may implement a step of explanations set computation (Step 1) which receives, as input, the input raw data R, predictive model from the pre-processing step A, and sampled raw data SR from the pre-processing step B and outputs a set of explanations by computing explanation for all combinations (X1, M_R), (X2, M_R), . . . , (Xn, M_R). Examples of set of explanations may include: XAI (X1, M_R)=(A=+4, B=−3, C=−19, D=−12); XAI (X2, M_R)= (A=+2, B=−3, C=−99, D=−1); . . . ; XAI (Xn, M_R)=(A=+1, B=−4, C=−23, D=+2), but the disclosure is not limited thereto.

According to exemplary embodiments, the DPCM 406 may implement a step of explanation compression technique (Step 2) which receives the set of explanations from Step 1 as input and outputs a set of compressed explanations. According to exemplary embodiments, Step 2 implemented by the DPCM 406 may includes techniques, such as, autoencoder, Principal Component Analysis (PCA), but the disclosure is not limited thereto. In implementing Step 2, the DPCM 406 may compute a compact representation of explanations aiming at one dimension, but could be changed to two or three or more dimensions based on compression quality, but the disclosure is not limited thereto. Exemplary set of compressed explanations computed by DPCM 406 in Step 2 may include: (X1, M_R)=1, (X2, M_R)=2, . . . , (Xn, M_R)=6, but the disclosure is not limited thereto.

Figure 5A:
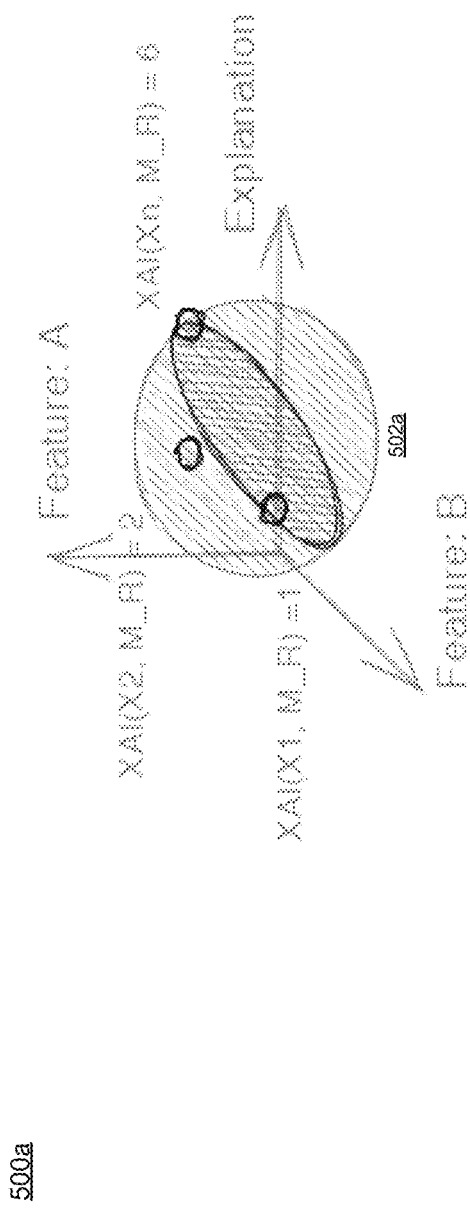
FIG. 5A illustrates an exemplary graphical user interface that illustrates explanations of data point as computed by the data points computing module of FIG. 4 in accordance with an exemplary embodiment.

According to exemplary embodiments, the DPCM 406 may implement a step of multi-dimensional explanation search space computation (Step 3) which receives the set of compressed explanations from Step 2 as input and outputs a unique representation of model explanation with respect to dimensions such as: inference results, raw data dimensions, etc., (explanations of data point Xi; wrt Raw data dimensions (=n dimension), but the disclosure is not limited thereto. For example, FIG. 5A illustrates an exemplary graphical user interface 500a that illustrates explanations of data point 502a as computed by the DPCM 406 of FIG. 4 in accordance with an exemplary embodiment illustrated in three dimensions having explanation in x-axis, Feature A in y-axis, and Feature B in z-axis.

According to exemplary embodiments, the DPCM 406 may implement a step of variability test (Step 4) which receives, as input, the compressed explanations XAI(TD, M_R)=1 from pre-processing of data perturbation as disclosed above, explanation of variability, i.e., variability score=2, and the compressed explanations XAI(T, M_R=5 from the pre-processing step of model training and input target data T to be tested and challenged as disclosed above, and checks whether the explanation is robust to changes in data through data perturbation. For example, Step 4 implemented by the DPCM 406 may include as follows: IF ABS(XAI(TD)−XAI(T)) is greater than explanation variability score (where ABS stands for "absolute value of"), THEN move to Step 5. ELSE data is robust to perturbation wrt explanation. For example, XAI(T, M_R)=6 MINUS XAI(TD, M_R)=1 IS 5, which is higher than explanation variability score of 2.

Figure 5B:
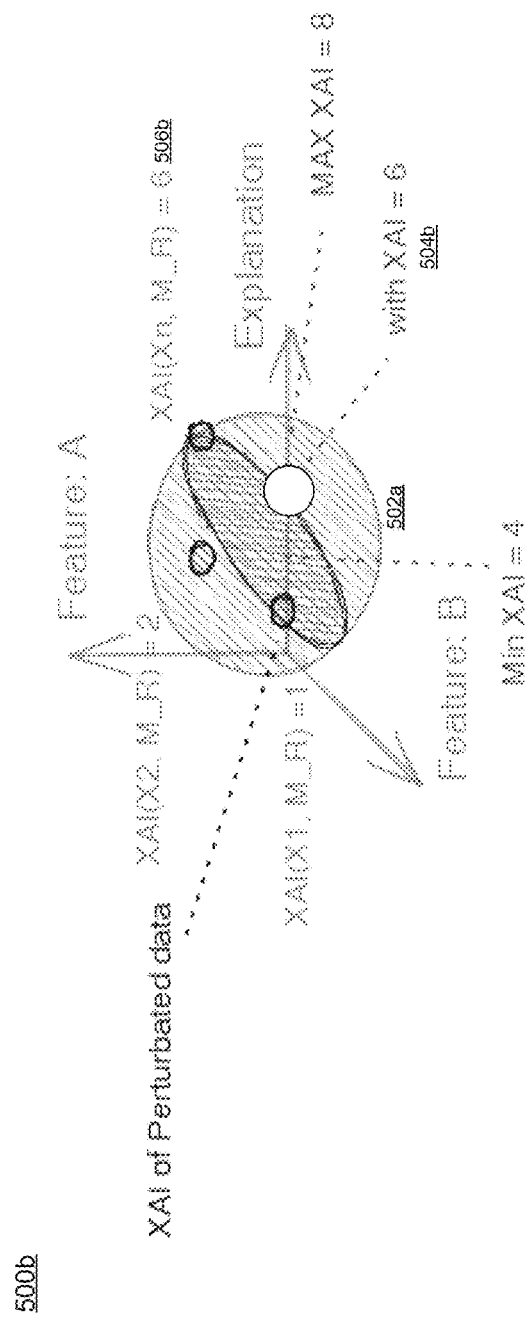
FIG. 5B illustrates an exemplary graphical user interface that illustrates change-agnostic data points as identified by the data points computing module of FIG. 4 in accordance with an exemplary embodiment.

According to exemplary embodiments, the DPCM 406 may implement a step of computing change-agnostic data points (Step 5) which receives, as input, the variability test result (i.e., ABS(XAI(TD)−XAI(T)) is greater than explanation variability score), the input target data T to be tested and challenged, explanations of data point outputted from Step 3, and the variability score (i.e., variability score=2), and outputs change-agonistic data points (i.e., identified data points which do not change much in terms of explanation (explanation variability), and are close to input data T. For example, FIG. 5B illustrates an exemplary graphical user interface 500b that illustrates change-agnostic data points as identified by the DPCM 406 of FIG. 4 in accordance with an exemplary embodiment. As illustrated in FIG. 5B, Min XAI=4, Max XAI=8 with XAI=6 (element 504b), XAI of perturbated data, and XAI (Xn, M_R)=6 (element 506b).

Figure 5C:
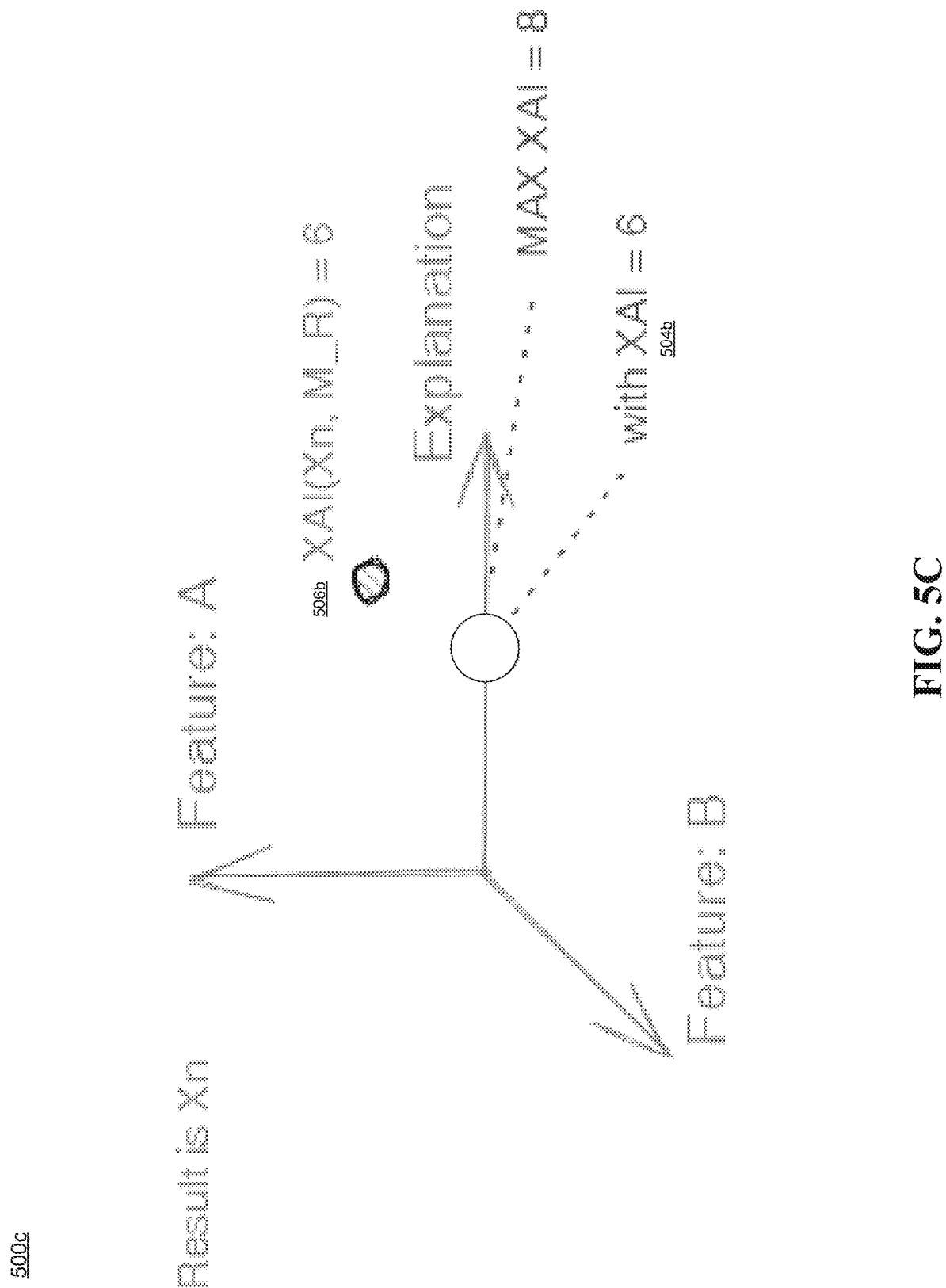
FIG. 5C illustrates an exemplary graphical user interface that illustrates change-gnostic data point of T with respect to perturbation as computed by the data points computing module of FIG. 4 in accordance with an exemplary embodiment.

According to exemplary embodiments, Step 5 implemented by the DPCM 406 may include the following for all data points Z in explanation search space: i) computing the distance between Z and T such that explanation variability is less than explanation variability threshold: ii) storing the result from i) and outputting (returning) data points which are closest to T and are in the result list. FIG. 5C illustrates an exemplary graphical user interface 500c that illustrates change-gnostic data point of T with respect to perturbation as computed by the DPCM 406 of FIG. 4 in accordance with an exemplary embodiment. For example, as illustrated in FIG. 5C, result is Xn, with XAI=6 (element 504b) and XAI(Xn, M_R)=6 (element 506b).

There might be a scenario where data might not necessarily exist. For example, one could create synthetic data that satisfy the explanation variability constraint, or simply, the data point does not exist and need to be constructed.

For example, referring back to FIG. 4, the receiving module 414 may be configured to receive at least a first set of raw data that is usable for training a machine learning model. The training module 416 may be configured to train the machine learning model by using the at least the first set of raw data. The computing module 418 may be configured to compute a set of explanations for all combinations based on output data of the trained machine learning model, the first set of raw data, and sampled raw data computed by applying a sampling algorithm on the raw data. The computing module 418 may be further configured to compute a compact representation of the set of explanations corresponding to a pre-configured dimension based on compression quality and generating a set of compressed explanations and compute a unique representation of model explanation with respect to the pre-configured dimension. The determining module 420 may be configured to determine whether the model explanation is robust to changes in data through data perturbation. The computing module 418 may be configured to compute change-agnostic data points based on determining that the model explanation is robust to changes in data through data perturbation.

According to exemplary embodiments, the first set of raw data may include prediction data computed by the machine learning model, input raw data utilized for navigating explanation-dimension used for extending explanation search space, and sampled raw data computed by implementing a data distribution sampling strategy on the input raw data.

According to exemplary embodiments, the machine learning model may include one or more of the following models: decision tree, ensemble tress, neural network architectures, and predictive model, but the disclosure is not limited thereto.

According to exemplary embodiments, the preconfigured dimension may include one dimensional representation, two dimensional representation, three dimensional representation, or more than three dimensional representations based on the compression quality.

According to exemplary embodiments, in computing the set of compressed explanations, the implanting module 422 may be configured to implement an auto-encoder algorithm or principal component analysis algorithm.

According to exemplary embodiments, in determining whether the model explanation is robust to changes in data through data perturbation, the receiving module 414 may be configured to receive perturbated input data to be tested, wherein the perturbated input data is generated by implementing a data perturbation strategy: receive the first set of raw data; receive the sampled raw data. The generating module 424 may be configured to generate perturbated target data based on processing the received perturbated input data, the first set of raw data, and the sampled raw data: and the testing module 426 may be configured to perform a variability test based on compressed explanations of the perturbated target data, compressed explanations of input target data: and explanation variability score that is described as a vector along the pre-configured dimension.

According to exemplary embodiments, the determining module 420 may be configured to determine whether a numerical value of compressed explanations of the perturbated target data is greater than the explanation variability score: and the computing module 418 may be configured to compute the change-agnostic data points based on a determination that the numerical value of the compressed explanations of the perturbated target data is greater than the explanation variability score.

According to exemplary embodiments, the data perturbation strategy may include adding 1 to all features or replace one feature by an average value of all individual features to the at least the first set of raw data.

According to exemplary embodiments, each of the graphical user interface 500a, 500b, and 500c may be the same or similar to the GUI 430 which may be utilized to display the charts or explanations disclosed herein.

Figure 6:
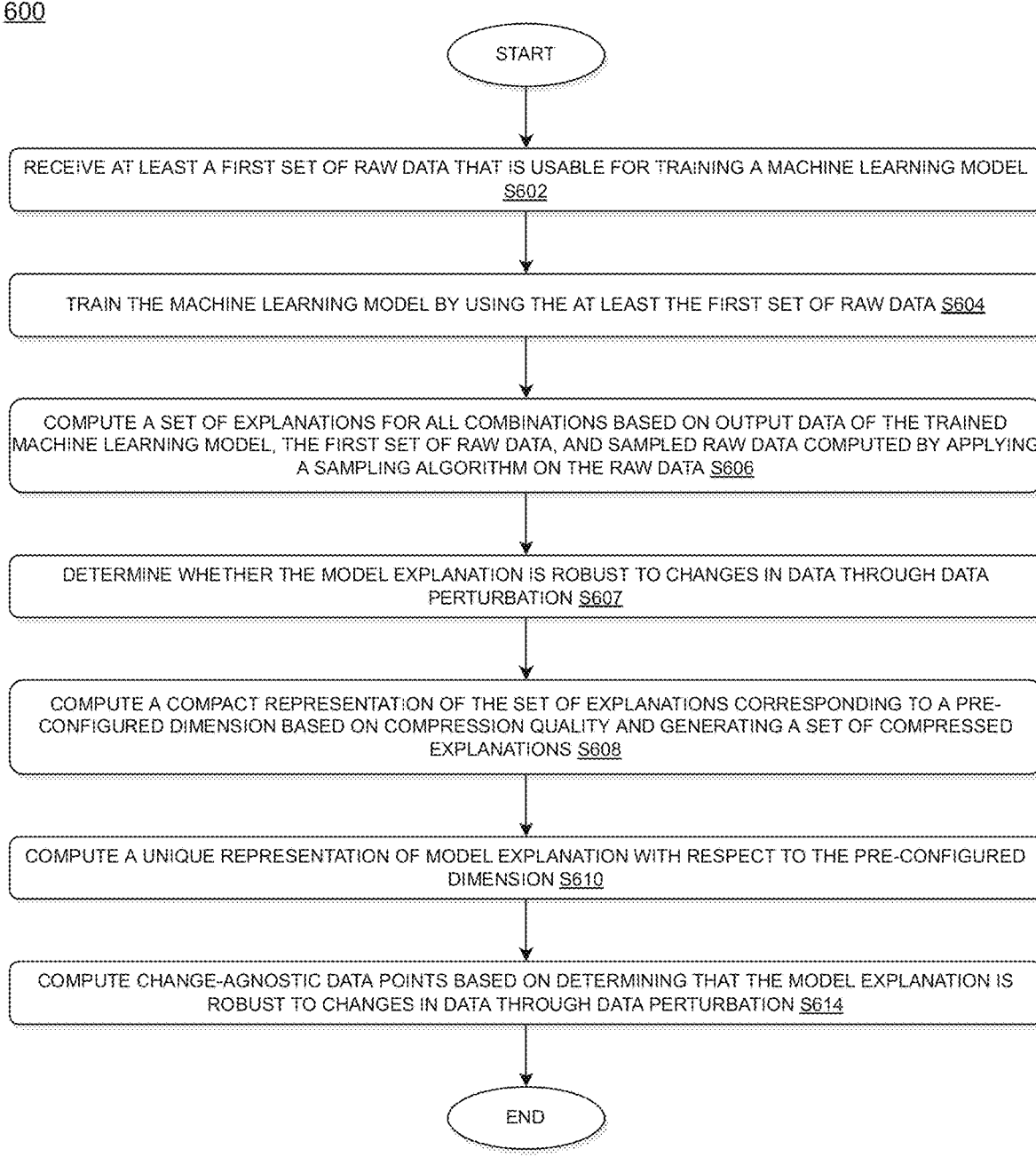
FIG. 6 illustrates an exemplary flow diagram implemented by the data points computing module of FIG. 4 for computing change-agnostic data points in accordance with an exemplary embodiment.

FIG. 6 illustrates an exemplary flow chart 600 implemented by the platform, language, database, and cloud agnostic DPCM 406 of FIG. 4 for computing change-agnostic data points in accordance with an exemplary embodiment. It may be appreciated that the illustrated process 600 and associated steps may be performed in a different order, with illustrated steps omitted, with additional steps added, or with a combination of reordered, combined, omitted, or additional steps.

As illustrated in FIG. 6, at step S602, the process 600 may include receiving at least a first set of raw data that is usable for training a machine learning model.

At step S604, the process 600 may include training the machine learning model by using the at least the first set of raw data.

At step S606, the process 600 may include computing a set of explanations for all combinations based on output data of the trained machine learning model, the first set of raw data, and sampled raw data computed by applying a sampling algorithm on the raw data.

At step S607, the process 600 may include determining whether the model explanation is robust to changes in data through data perturbation.

At step S608, the process 600 may include computing a compact representation of the set of explanations corresponding to a pre-configured dimension based on compression quality and generating a set of compressed explanations.

At step S610, the process 600 may include computing a unique representation of model explanation with respect to the pre-configured dimension.

At step S614, the process 600 may include computing change-agnostic data points based on determining that the model explanation is robust to changes in data through data perturbation.

According to exemplary embodiments, in the process 600, the first set of raw data may include prediction data computed by the machine learning model, input raw data utilized for navigating explanation-dimension used for extending explanation search space, and sampled raw data computed by implementing a data distribution sampling strategy on the input raw data.

According to exemplary embodiments, in the process 600, the preconfigured dimension includes one dimensional representation, two dimensional representation, three dimensional representation, or more than three dimensional representations based on the compression quality.

According to exemplary embodiments, in computing the set of compressed explanations, the process 600 may further include: implementing an auto-encoder algorithm or principal component analysis algorithm.

According to exemplary embodiments, in determining whether the model explanation is robust to changes in data through data perturbation, the process 600 may further include: receiving perturbated input data to be tested, wherein the perturbated input data is generated by implementing a data perturbation strategy: receiving the first set of raw data; receiving the sampled raw data: generating perturbated target data based on processing the received perturbated input data, the first set of raw data, and the sampled raw data: and performing a variability test based on compressed explanations of the perturbated target data, compressed explanations of input target data: and explanation variability score that is described as a vector along the pre-configured dimension.

According to exemplary embodiments, in the process 600, the data perturbation strategy includes adding 1 to all features or replace one feature by an average value of all individual features to the at least the first set of raw data.

According to exemplary embodiments, the process 600 may further include: determining whether a numerical value of compressed explanations of the perturbated target data is greater than the explanation variability score: and computing the change-agnostic data points based on a determination that the numerical value of the compressed explanations of the perturbated target data is greater than the explanation variability score.

According to exemplary embodiments, in the process 600, the machine learning model includes one or more of the following models: decision tree, ensemble tress, neural network architectures, and predictive model, but the disclosure is not limited thereto.

According to exemplary embodiments, the DPCD 402 may include a memory (e.g., a memory 106 as illustrated in FIG. 1) which may be a non-transitory computer readable medium that may be configured to store instructions for implementing a platform, language, database, and cloud agnostic DPCM 406, for computing change-agnostic data points as disclosed herein. The DPCD 402 may also include a medium reader (e.g., a medium reader 112 as illustrated in FIG. 1) which may be configured to read any one or more sets of instructions, e.g., software, from any of the memories described herein. The instructions, when executed by a processor embedded within the DPCM 406, or within the DPCD 402, may be used to perform one or more of the methods and processes as described herein. In a particular embodiment, the instructions may reside completely, or at least partially, within the memory 106, the medium reader 112, and/or the processor 104 (see FIG. 1) during execution by the DPCD 402.

According to exemplary embodiments, the instructions, when executed, may cause the processor 104 embedded within the DPCM 406, or the DPCD 402 to perform the following: receiving at least a first set of raw data that is usable for training a machine learning model; training the machine learning model by using the at least the first set of raw data; computing a set of explanations for all combinations based on output data of the trained machine learning model, the first set of raw data, and sampled raw data computed by applying a sampling algorithm on the raw data: computing a compact representation of the set of explanations corresponding to a pre-configured dimension based on compression quality and generating a set of compressed explanations: computing a unique representation of model explanation with respect to the pre-configured dimension: determining whether the model explanation is robust to changes in data through data perturbation: and computing change-agnostic data points based on determining that the model explanation is robust to changes in data through data perturbation.

According to exemplary embodiments, in computing the set of compressed explanations, the instructions, when executed, may cause the processor 104 to perform the following: implementing an auto-encoder algorithm or principal component analysis algorithm.

According to exemplary embodiments, in determining whether the model explanation is robust to changes in data through data perturbation, the instructions, when executed, may cause the processor 104 to perform the following: receiving perturbated input data to be tested, wherein the perturbated input data is generated by implementing a data perturbation strategy: receiving the first set of raw data: receiving the sampled raw data; generating perturbated target data based on processing the received perturbated input data, the first set of raw data, and the sampled raw data: and performing a variability test based on compressed explanations of the perturbated target data, compressed explanations of input target data: and explanation variability score that is described as a vector along the pre-configured dimension.

According to exemplary embodiments, the instructions, when executed, may cause the processor 104 to perform the following: determining whether a numerical value of compressed explanations of the perturbated target data is greater than the explanation variability score: and computing the change-agnostic data points based on a determination that the numerical value of the compressed explanations of the perturbated target data is greater than the explanation variability score.

According to exemplary embodiments as disclosed above in FIGS. 1-6, technical improvements effected by the instant disclosure may include a platform for implementing a platform, language, database, and cloud agnostic data points computing module configured to compute change-agnostic data points which are robust to explanation stress testing so that outputs generated by a model remain the same in response to change under input data manipulation or small perturbations, but the disclosure is not limited thereto. According to exemplary embodiments as disclosed above in FIGS. 1-6, technical improvements effected by the instant disclosure may include a platform for implementing a platform, language, database, and cloud agnostic construct the change-agnostic data points that exist in the initial distribution of data points. According to exemplary embodiments, the data points computing module may be configured to compute such individuals (input data) as explanation-trusted input data close to the initial input data in case data could be changed and updated, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for computing change-agnostic data points by utilizing one or more processors along with allocated memory, the method comprising:
receiving at least a first set of raw data that is usable for training a machine learning model;

training the machine learning model by using the at least the first set of raw data;

computing a set of explanations for all combinations based on output data of the trained machine learning model, the first set of raw data, and sampled raw data computed by applying a sampling algorithm on the raw data;

computing a compact representation of the set of explanations corresponding to a pre-configured dimension based on compression quality and generating a set of compressed explanations;

computing a unique representation of model explanation with respect to the pre-configured dimension;

determining whether the model explanation is robust to changes in data through data perturbation; and computing change-agnostic data points based on determining that the model explanation is robust to changes in data through data perturbation.

2. The method of claim 1, wherein the first set of raw data includes prediction data computed by the machine learning model, input raw data utilized for navigating explanation-dimension used for extending explanation search space, and sampled raw data computed by implementing a data distribution sampling strategy on the input raw data.

3. The method according to claim 1, wherein the preconfigured dimension includes one dimensional representation, two dimensional representation, three dimensional representation, or more than three dimensional representations based on the compression quality.

4. The method according to claim 3, wherein in computing the set of compressed explanations, the method further comprising:
implementing an auto-encoder algorithm or principal component analysis algorithm.

5. The method according to claim 1, wherein in determining whether the model explanation is robust to changes in data through data perturbation, the method further comprising:
receiving perturbated input data to be tested, wherein the perturbated input data is generated by implementing a data perturbation strategy;
receiving the first set of raw data;
receiving the sampled raw data;
generating perturbated target data based on processing the received perturbated input data, the first set of raw data, and the sampled raw data; and
performing a variability test based on compressed explanations of the perturbated target data, compressed explanations of input target data; and explanation variability score that is described as a vector along the pre-configured dimension.

6. The method according to claim 5, wherein the data perturbation strategy includes adding 1 to all features or replace one feature by an average value of all individual features to the at least the first set of raw data.

7. The method according to claim 6, further comprising:
determining whether a numerical value of compressed explanations of the perturbated target data is greater than the explanation variability score; and
computing the change-agnostic data points based on a determination that the numerical value of the compressed explanations of the perturbated target data is greater than the explanation variability score.

8. The method according to claim 1, wherein the machine learning model includes one or more of the following models: decision tree, ensemble trees, neural network architectures, and predictive model.

9. A system for computing change-agnostic data points, the system comprising:
a processor; and
a memory operatively connected to the processor via a communication interface, the memory storing computer readable instructions, when executed, causes the processor to:
receive at least a first set of raw data that is usable for training a machine learning model;
train the machine learning model by using the at least the first set of raw data;
compute a set of explanations for all combinations based on output data of the trained machine learning model, the first set of raw data, and sampled raw data computed by applying a sampling algorithm on the raw data;
compute a compact representation of the set of explanations corresponding to a pre-configured dimension based on compression quality and generating a set of compressed explanations;
compute a unique representation of model explanation with respect to the pre-configured dimension;
determine whether the model explanation is robust to changes in data through data perturbation; and
compute change-agnostic data points based on determining that the model explanation is robust to changes in data through data perturbation.

10. The system of claim 9, wherein the first set of raw data includes prediction data computed by the machine learning model, input raw data utilized for navigating explanation-dimension used for extending explanation search space, and sampled raw data computed by implementing a data distribution sampling strategy on the input raw data.

11. The system according to claim 9, wherein the preconfigured dimension includes one dimensional representation, two dimensional representation, three dimensional representation, or more than three dimensional representations based on the compression quality.

12. The system according to claim 11, in computing the set of compressed explanations, the processor is further configured to:
implement an auto-encoder algorithm or principal component analysis algorithm.

13. The system according to claim 9, in determining whether the model explanation is robust to changes in data through data perturbation, the processor is further configured to:
receive perturbated input data to be tested, wherein the perturbated input data is generated by implementing a data perturbation strategy;
receive the first set of raw data;
receive the sampled raw data;
generate perturbated target data based on processing the received perturbated input data, the first set of raw data, and the sampled raw data; and
perform a variability test based on compressed explanations of the perturbated target data, compressed explanations of input target data; and explanation variability score that is described as a vector along the pre-configured dimension.

14. The system according to claim 13, wherein the data perturbation strategy includes adding 1 to all features or replace one feature by an average value of all individual features to the at least the first set of raw data.

15. The system according to claim 14, wherein the processor is further configured to:

determine whether a numerical value of compressed explanations of the perturbated target data is greater than the explanation variability score; and compute the change-agnostic data points based on a determination that the numerical value of the compressed explanations of the perturbated target data is greater than the explanation variability score.

16. The system according to claim 9, wherein the machine learning model includes one or more of the following models: decision tree, ensemble trees, neural network architectures, and predictive model.

17. A non-transitory computer readable medium configured to store instructions for computing change-agnostic data points, the instructions, when executed, cause a processor to perform the following:

receiving at least a first set of raw data that is usable for training a machine learning model;

training the machine learning model by using the at least the first set of raw data;

computing a set of explanations for all combinations based on output data of the trained machine learning model, the first set of raw data, and sampled raw data computed by applying a sampling algorithm on the raw data;

computing a compact representation of the set of explanations corresponding to a pre-configured dimension based on compression quality and generating a set of compressed explanations;

computing a unique representation of model explanation with respect to the pre-configured dimension;

determining whether the model explanation is robust to changes in data through data perturbation; and computing change-agnostic data points based on determining that the model explanation is robust to changes in data through data perturbation.

18. The non-transitory computer readable medium according to claim 17, in determining whether the model explanation is robust to changes in data through data perturbation, the instructions, when executed, cause the processor to further perform the following:

receiving perturbated input data to be tested, wherein the perturbated input data is generated by implementing a data perturbation strategy;

receiving the first set of raw data;

receiving the sampled raw data;

generating perturbated target data based on processing the received perturbated input data, the first set of raw data, and the sampled raw data; and performing a variability test based on compressed explanations of the perturbated target data, compressed explanations of input target data; and explanation variability score that is described as a vector along the pre-configured dimension.

19. The non-transitory computer readable medium according to claim 18, wherein the data perturbation strategy includes adding 1 to all features or replace one feature by an average value of all individual features to the at least the first set of raw data.

20. The non-transitory computer readable medium according to claim 19, the instructions, when executed, cause the processor to further perform the following:

determining whether a numerical value of compressed explanations of the perturbated target data is greater than the explanation variability score; and computing the change-agnostic data points based on a determination that the numerical value of the compressed explanations of the perturbated target data is greater than the explanation variability score.

* * * * *